Patented Oct. 26, 1954

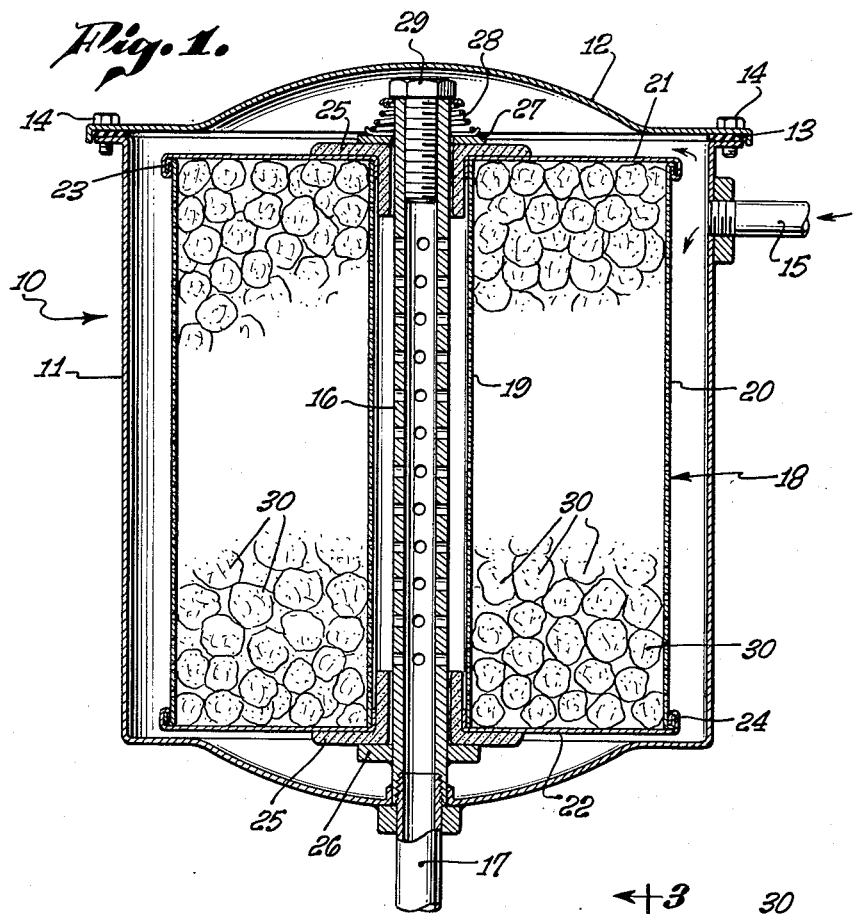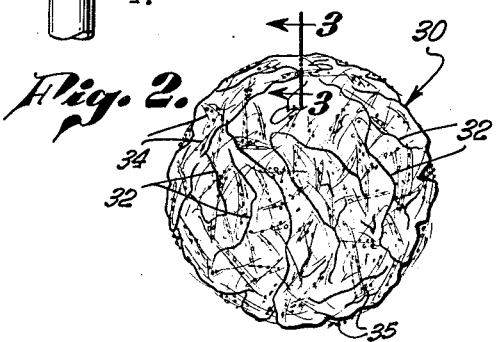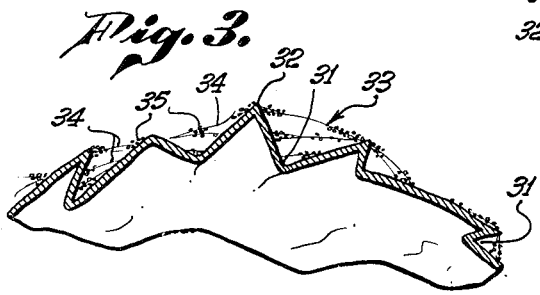

2,692,683

UNITED STATES PATENT OFFICE 2,692,683

FILTER

Veyne V. Mason, Los Angeles, Calif.

Application April 9, 1951, Serial No. 219,919

8 Claims. (Cl. 210—148)

This invention relates to filters for removing solid particles from a fluid stream, and is particularly concerned with the removal of carbonaceous and other impurities from engine lubricating oil. Certain features of the invention represent improvements in the general type of filter shown in my application Serial Number 160,414, filed May 6, 1950, on Engine Oil Filter.

The first of the above mentioned applications discloses a novel engine oil filter which employs as a filtering medium a mass of paper crumpled and compacted in a manner to present to the oil a multiplicity of sharply defined fold edges and oil penetrable voids between the edges. For maximum filtering efficiency, the paper is preferably newsprint, and is formed into a plurality of individual pellets compacted together in a common receptacle. Such crumpled paper has proven extremely effective in removing colloidally suspended particles from engine lubricating oil, the effectiveness of the filter apparently resulting from the development of unlike electrostatic charges on the paper and particles respectively, with consequent electrostatic attraction of the particles to the paper.

The present invention in certain of its aspects is directed to improvements in filters of this general type, employing crumpled non-conductive sheet material, preferably paper, as a filtering medium, and in particular is directed to means for adding to the filtering efficiency of such material. Specifically, the efficiency is increased by attaching to the crumpled mass a second non-conductive material, preferably a resinous plastic material, which responds to frictional contact with the moving oil or other fluid being filtered in a manner increasing the electrostatic charges, and therefore enhancing the particle removing effectiveness of the filter. As will appear, best results are obtained when the plastic material only partially or discontinuously covers the various surfaces of the crumpled paper, leaving substantial areas of the paper exposed directly to the oil. It is then found that the major portion of the separated particles are attracted to and accumulate on the exposed paper surfaces, the plastic acting merely to enhance the particle accumulation on the paper. To perform its function well, the plastic or other material applied to the paper should be of a type having a relatively high dielectric strength, desirably of at least about 450 volts per mil.

Certain particular features of the invention are directed to a preferred structural arrangement of such non-conductive material on a crumpled mass of paper or other body of filtering material. For one thing, I find it desirable that the plastic or non-conductive material be applied to and project outwardly discontinuously from the surface of the filtering material, as distinguished from being impregnated into it, so that a maximum surface area of the non-conductive material may be exposed to the fluid being filtered. Preferably, the plastic or other non-conductive material is formed into a web-like arrangement having elongated strands extending between irregular surfaces of the filtering material and across oil penetrable voids formed between those surfaces. In addition, globules or droplets of the plastic material may be attached randomly to the various strands and to the surfaces of the filter material, in a manner forming a large surface area network of plastic material about the filter material.

Additional features of the invention involve the provision in an electrostatic filter of the above type, comprising two different non-conductive filtering materials, of means for insulating the filter element from an electrically conductive supporting structure, and preferably from an outer metallic shell, to prevent the developed electric charges from leaking off of the element. For this purpose, I may employ a pair of insulators at opposite ends of the filter element acting to insulate it from a fluid discharge tube on which it is carried.

The above and other features and objects of the present invention will be better understood from the following detailed description of the typical embodiment illustrated in the accompanying drawing, in which:

Fig. 1 is a vertical sectional view through an engine lubricating oil filter embodying the invention;

Fig. 2 is an enlarged perspective view of one of the paper pellets forming the filtering medium of the device in Fig. 1; and Fig. 3 is a further enlarged fragmentary section through an outer portion of the Fig. 2 pellet, and showing especially the manner in which the web of electrically nonconductive material is carried by the pellet.

Referring first to Fig. 1, the filter 10 there shown includes the usual metallic shell 11 having a cover 12 fastened to the shell and against a gasket 13 by a series of circularly spaced screws 14. The fluid to be filtered enters the shell through lateral inlet 15, and leaves through a perforated discharge tube 16 projecting upwardly from the bottom of the shell and connecting with outlet line 17.

In flowing from inlet 15 to discharge tube 16, the fluid being filtered passes transversely through an annular replaceable filter element 18 carried about the discharge tube. This filter element includes an annular housing having radial inner and outer perforated metallic side walls 19 and 20, and annular top and bottom walls 21 and 22 crimped to the outer wall at 23 and 24. The filter element is positioned in spaced relation to and insulated from discharge tube 16 by upper and lower insulators 25, the lower one of which rests on a supporting flange 26 carried by the discharge tube. Preferably, the two insulators are formed of wood coated with a suitable silicone plastic. The filter element and its insulators may be retained on the discharge tube 16 by a suitable washer 27 and spring 28, received about the discharge tube above the upper insulator, and themselves retained by a screw 29 threaded into the upper end of the discharge tube.

The removal of carbonaceous and other particles from the fluid being filtered is effected by a compacted mass of pellets 30 contained within the filter element, and each formed of sheet paper crumpled to the substantially spherical or ball shape of Fig. 2. The various paper pellets should be at least about 1/4 inch in diameter, and are particularly effective when within the range of about 1/4 to 1 inch in diameter. Each pellet is preferably formed of a single sheet of paper, which may typically be about 5 inches square, in which case the resulting pellet in a free state will have a diameter of roughly 3/4 of an inch. Best results have been obtained by forming the pellets of newsprint paper, apparently by reason of its pH characteristics, its ability to electrostatically attract particles carried by the fluid being filtered, and the unglazed condition of its surface.

It is particularly noted that the compaction of the paper pellets is not carried to the extent of forming a completely solid geometrical body, but rather is stopped short of that extreme, so that each pellet contains a number of fluid penetrable voids 31 extending deeply into the pellet between the paper surfaces. Similar fluid passing voids are formed between the various intercontacting surfaces of adjacent pellets. Alongside each of the voids, the crumpled paper presents sharply defined fold edges 32 in contact with the fluid being filtered. As a result of this formation of the paper pellets, a very large paper surface area is presented to the oil or other fluid, to assure effective separation of the oil carried particles.

About each of the pellets of crumpled paper, I provide a web-like arrangement of substantially electrically nonconductive material 33, preferably a resinous plastic material, attached to the pellet and responding to frictional contact with the moving oil to enhance the development of electrostatic charges acting to separate particles from the oil. The web-like arrangement 33 of plastic or other material includes a large number of elongated strands 34 of the material extending across the voids 31, and each attached at its opposite ends to opposed surfaces of the paper or other strands. A large number of globules or droplets 35 of the plastic material are attached randomly to the various strands 34 and to the paper surfaces. It is pointed out, however, that the strands and globules of plastic material only discontinuously cover the surfaces of the paper, leaving a substantial portion of the paper surface area, typically about 1/2, directly exposed to the fluid being filtered.

To attain maximum filtering efficiency, the web 33 should be formed of a material of very high dielectric strength, at least about 450 and preferably about 550 volts per mil breakdown potential. In addition, this material must of course be able to withstand any conditions which may be encountered in use. For instance, it must be insoluble in the fluid to be filtered and unaffected by the particles carried by the fluid. When the filter is to be used as a lubricating oil filter, this means that the plastic or other material must not be soluble in or affected by the lubricating oil, its additives, any products of partial breakdown of the oil, or water (often present in small amounts in the oil). Further, the plastic must be thermostable under oil temperatures encountered in normal engine operation, that is, up to about 100 degrees C.

I prefer to apply the plastic material by spraying a substantially instantaneously air drying solution of the material onto the outer surfaces of the pellets immediately after their formation. Very good results have been obtained by so spraying a plastic solution of the following composition: 20% polyvinyl chloride resin, 20% toluene or methyl isobutyl ketone, and 60% methyl ethyl ketone. When an amount of this material insufficient to completely cover the surfaces on the paper is sprayed onto a pellet, the web-like arrangement previously described is formed. Some of the sprayed drops of the plastic are deflected from one paper surface to another in a manner forming the strands 34, while other drops of plastic attach directly to the strands or the paper surfaces in globular or droplet form. Practically none of the plastic, however, is absorbed into the paper, the solution being of such a nature that the plastic dries in the form of the defined strands and globules standing out from the surfaces of the paper, before having an opportunity to be absorbed. The plastic deposited on the paper by spraying the above composition has a dielectric strength of about 550 volts per mil.

When the filter is in use, the filtering action is effected by attraction of the oil carried particles to the paper as the oil passes over the various paper surfaces. There is consequently no necessity for the oil to flow through the paper, as might be expected. As pointed out previously, the particles are apparently attracted to the paper by reason of the presence of unlike electrostatic charges on the paper and particles. The plastic material increases this electrostatic attraction as a result of the frictional contact between the fluid and plastic, and by test has increased the efficiency of the filter as much as 50%. By virtue of its web-like arrangement, the plastic presents a relatively large surface area to the moving oil, to thus maximize the effect of the plastic. Also, since the plastic is not absorbed into the paper but is merely carried on its surface, the paper internally retains its normal porous condition, which is found desirable for best filtering results.

I claim:

1. An oil filter element for removing colloidally-suspended particles from a fluid stream comprising: a receptacle having apertures through which oil flows thereinto and therefrom; an oil passing compacted mass of sheet paper in said receptacle, said paper being crumpled to present sharply-defined folded edges and oil-penetrable voids therebetween formed by the paper folds, the oil being filtered passing over and in contact with the surfaces of said paper; a web-like arrangement of elongated strands extending across said voids, said strands being of high dielectric strength plastic material insoluble in the oil being filtered; and a plurality of globules of said plastic material attached randomly to said strands and to said paper surfaces leaving large areas of the latter exposed to the oil, substantially none of said plastic material being absorbed into the body of said paper.

2. The structure defined in claim 1 in which the mass comprises separate crumped pellets of newsprint paper.

3. The structure defined in claim 1 in which the plastic material is resinous and has a dielectric strength of at least about 450 volts per mil.

4. The structure defined in claim 1 in which the plastic material is polyvinyl chloride.

5. The structure defined in claim 1 in which the mass comprises separate crumpled pellets of newsprint paper and the plastic material is resinous and has a dielectric strength of at least about 450 volts per mil.

6. The structure defined in claim 1 in which the mass comprises crumpled pellets of newsprint paper and the plastic material is polyvinyl chloride.

7. An oil filter element comprising a receptacle having apertures through which oil flows thereinto and therefrom, an oil passing compacted mass of pellets in the receptacle each formed of sheet newsprint paper crumpled to present sharply defined outer folded edges and oil penetrable voids formed by the paper folds and extending deeply into the pellet between said edges and between the intercontacting surfaces of the pellets, a web-like arrangement of resinous plastic material having a dielectric strength of at least about 450 volts per mil. carried by said pellets in contact with the oil and including elongated strands of said plastic material extending across said voids, and a plurality of globules of said plastic material attached randomly to said strands and to the surface of the paper, said strands and globules of plastic material leaving exposed to the oil substantial portions of the surface of said paper, substantially none of said plastic material being absorbed into the body of said paper.

8. A filter element comprising a fluid passing mass of sheet material crumpled to present sharply defined fold edges and fluid penetrable voids between said edges, and a web-like arrangement of substantially electrically non-conductive resinous plastic material carried by the mass of sheet material in contact with said fluid and including elongated strands of said resinous plastic material extending across said voids.

References Cited in the file of this patent

UNITED STATES PATENTS

| Number | Name | Date |
|---|---|---|
| 1,744,510 | Hele-Shaw et al. | Jan. 21, 1930 |
| 2,349,469 | Sloan | May 23, 1944 |
| 2,369,857 | Russell et al. | Feb. 20, 1945 |
| 2,549,698 | Mason | Apr. 17, 1951 |